(12) United States Patent
McPherson et al.

(10) Patent No.: US 11,943,197 B1
(45) Date of Patent: *Mar. 26, 2024

(54) SYSTEMS, DEVICES, AND METHODS FOR POLYMORPHIC DOMAIN NAME RESOLUTION

(71) Applicant: VeriSign, Inc., Reston, VA (US)

(72) Inventors: Danny McPherson, Leesburg, VA (US); Eric Osterweil, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,085

(22) Filed: Sep. 30, 2022

Related U.S. Application Data

(63) Continuation of application No. 15/392,530, filed on Dec. 28, 2016, now Pat. No. 11,477,159.

(51) Int. Cl.
*H04L 61/4511* (2022.01)
*H04W 4/021* (2018.01)
*H04W 4/80* (2018.01)

(52) U.S. Cl.
CPC ......... *H04L 61/4511* (2022.05); *H04W 4/021* (2013.01); *H04W 4/80* (2018.02)

(58) Field of Classification Search
CPC ...... H04L 61/1511; H04W 4/80; H04W 4/021
See application file for complete search history.

(56) References Cited

U.S. PATENT DOCUMENTS

| | | | |
|---|---|---|---|
| 8,533,361 B1 | 9/2013 | Roskind | |
| 9,280,559 B1 | 3/2016 | Jones | |
| 10,033,691 B1 | 7/2018 | Mizik et al. | |
| 11,477,159 B1* | 10/2022 | McPherson | H04W 4/021 |
| 2004/0039798 A1* | 2/2004 | Hotz | H04L 61/4511 709/219 |
| 2005/0066041 A1 | 3/2005 | Chin et al. | |
| 2007/0050507 A1 | 3/2007 | Ollikinen et al. | |
| 2008/0155093 A1 | 6/2008 | Dharmistan | |
| 2011/0010413 A1* | 1/2011 | Christenson | H04L 61/4511 709/203 |
| 2011/0016534 A1 | 1/2011 | Jakobsson et al. | |
| 2012/0158969 A1 | 6/2012 | Dempsky et al. | |
| 2013/0198065 A1 | 8/2013 | McPherson et al. | |
| 2013/0332597 A1 | 12/2013 | Kumar | |
| 2015/0134730 A1 | 5/2015 | Seedorf et al. | |

(Continued)

*Primary Examiner* — Jerry B Dennison

(74) *Attorney, Agent, or Firm* — McCarter & English, LLP; Michael A. Sartori

(57) ABSTRACT

Embodiments relate to systems, devices, non-transitory computer-readable storage media, and computer-implemented methods for resolving DNS requests by receiving a first Domain Name System (DNS) resolution request, extracting first contextual data from the first DNS resolution request, determining to apply a first resolution rule based on the first contextual data and a contextual condition, forwarding the first DNS resolution request to a DNS resolver based on applying the first resolution rule, receiving a second DNS resolution request, extracting second contextual data from the second DNS resolution request, determining to apply a second resolution rule based on the second contextual data and the contextual condition, and retrieving a resource in response to the second DNS resolution request based on applying the second resolution rule.

20 Claims, 7 Drawing Sheets

(56) References Cited

U.S. PATENT DOCUMENTS

| | | | |
|---|---|---|---|
| 2015/0156162 A1* | 6/2015 | Kaliski, Jr. | ......... H04L 61/4505 |
| | | | 709/203 |
| 2015/0295882 A1 | 10/2015 | Kaliski, Jr. | |
| 2015/0350154 A1 | 12/2015 | Myla et al. | |
| 2016/0028847 A1 | 1/2016 | Bradshaw et al. | |
| 2016/0173440 A1 | 6/2016 | Stahura et al. | |
| 2016/0337104 A1 | 11/2016 | Kalligudd | |
| 2016/0357782 A1 | 12/2016 | Jones | |
| 2016/0358432 A1 | 12/2016 | Branscomb et al. | |
| 2017/0150308 A1 | 5/2017 | Jones | |
| 2017/0346855 A1* | 11/2017 | Reddy | ..................... H04L 63/20 |

\* cited by examiner

SYSTEMS, DEVICES, AND METHODS FOR POLYMORPHIC DOMAIN NAME RESOLUTION

PRIORITY

This application is a continuation of the U.S. patent application having Ser. No. 15/392,530, filed Dec. 28, 2016, the subject matter of which is incorporated herein by reference.

BACKGROUND

The Domain Name System (DNS) allows systems to connect with each other to communicate by associating domain names with numerical addresses. In some instances, DNS can refer to a global directory of domain names for use as part of the Internet. In other instances, DNS can be used internally by, for example, allowing users to access local resources available to users within an internal network. Examples of local resources include, but are not limited to, locally stored records that include a network address (e.g., DNS records), locally stored and maintained files, etc.

Generally, resolution of a domain name is static. A first device at a first location can transmit a DNS resolution request for EXAMPLE.COM and receive the same response as a second device at a second location that transmitted the same request. For example, the response can include an Internet Protocol (IP) address associated with EXAMPLE.COM. However, devices in different locations may not be attempting to access the same resource. For example, a first device within in an internal network may be attempting to access (or even discover) a local resource, while a second device not in the internal network may be attempting to access a global resource.

Further, current domain name resolution processes may require further navigation to reach a useful resource. For example, a request for EXAMPLE.COM may result in navigation to the home page of EXAMPLE.COM, which may not be in the language of the requesting user, may not be customized based on the location of the requesting user, may be a landing page for unregistered users when the requesting user is a registered user, etc. Thus, further navigation may be required to reach a webpage in the correct language, customized based on the user's location, mapping to a user's/group's specific needs, that is for registered users, etc. Such further navigation takes additional time and results in additional use of processing and networking resources.

Additionally, the DNS landscape is not limited to a single global DNS, but includes various internal top-level domains (iTLDs) that can be arbitrarily provisioned in closed networks and which can collide with global top-level domains (TLDs).

Therefore, there is a need for systems and methods that efficiently and dynamically resolve DNS resolution requests.

SUMMARY

The present disclosure relates to systems, devices, non-transitory computer-readable media, and methods for resolving DNS requests by receiving a first Domain Name System (DNS) resolution request, extracting first contextual data from the first DNS resolution request, determining to apply a first resolution rule based on the first contextual data and a contextual condition, forwarding the first DNS resolution request to a DNS resolver based on applying the first resolution rule, receiving a second DNS resolution request, extracting second contextual data from the second DNS resolution request, determining to apply a second resolution rule based on the second contextual data and the contextual condition, and retrieving a resource in response to the second DNS resolution request based on applying the second resolution rule.

In some embodiments, forwarding the first DNS resolution request to the DNS resolver can include forwarding the first DNS resolution request to a global DNS resolver.

In other embodiments, retrieving the resource in response to the second DNS resolution request can include retrieving, by an internal DNS resolver connected to an internal network, the resource from a storage connected to the internal network.

In further embodiments, the resource can be a DNS record.

In some implementations, the first DNS resolution request may have been forwarded by a DNS resolver.

In other implementations, the first contextual data can include a location of a first device that generated the first DNS resolution request, the second contextual data can include a location of a second device that generated the second DNS resolution request, the contextual condition can include a device location being within a geofence, the location of the first device can be outside of the geofence; and the location of the second device can be inside of the geofence.

In further implementations, the first contextual data can be encoded in a query name in the first DNS resolution request.

In some embodiments, the first contextual data can be included as metadata in the first DNS resolution request.

In other embodiments, the contextual condition can include at least one of: a connection signal strength to an access point being greater than a threshold or a username and password being authorized.

In further embodiments, the first contextual data can include at least one of a location, a connection signal strength, a near-field communication (NFC) connection, accelerometer data, ambient light data, a timestamp, a device request history, a list of programs installed on a computing device, an operating system installed on a computing device, installed hardware identifiers, an international mobile subscriber identify (IMSI) and related key, an Internet Protocol (IP) address, a media access control (MAC) address, a service set identifier (SSID), a certificate, a cryptographic key, a radio-frequency identification (RFID), camera detection data, a screen size, a central processing unit (CPU) speed, a total storage size, a total storage available, a total memory available, a network protocol choice, a network topology of a connected network, an IP packet Time To Live (TTL), a resource whitelist, a resource blacklist, a username, a password, demographic data, a user request history, a certificate associated with a user, or a cryptographic key associated with a user.

In some implementations, the first DNS resolution request can include a dotless domain name.

In other implementations, retrieving the resource in response to the second DNS resolution request can include determining whether to retrieve a first resource or a second resource based on applying the second resolution rule.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
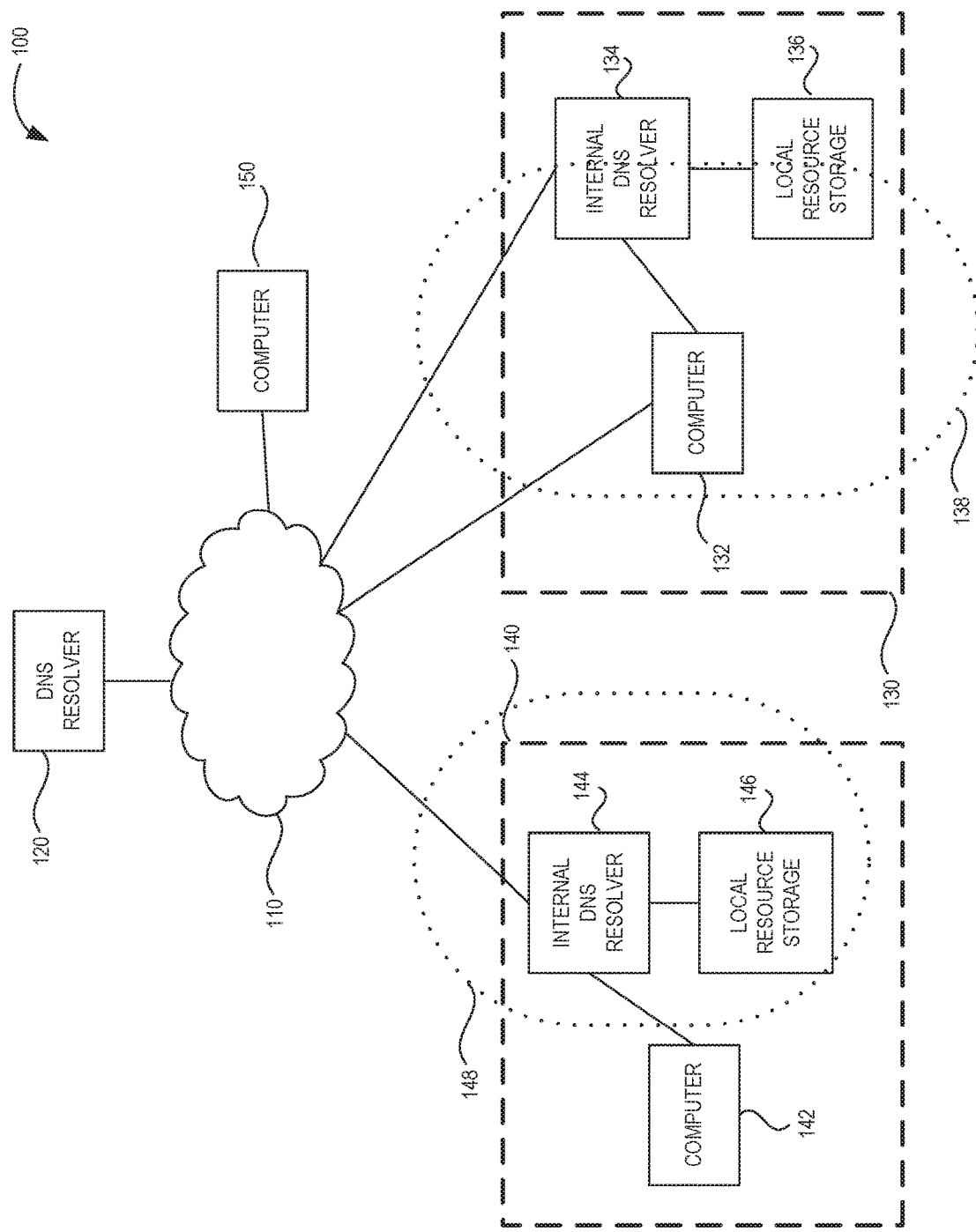
FIG. 1 is a diagram illustrating an example network environment that uses DNS, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

In a simple global DNS, a DNS resolver can receive DNS resolution requests for the same domain name, such as EXAMPLE.COM, and return the same IP address for each request. This may be an adequate process in some instances when using a global top-level domain (TLD), such as .COM. However, the process may require further navigation to reach a useful resource, and such further navigation takes additional time and results in additional use of processing and networking resources.

Additionally, as described above, the list of TLDs is continuously expanding, and various organizations and locations use iTLDs for local traffic. Further, the DNS landscape could expand to include dotless domain names, which are domain names that use a single label (e.g., EXAMPLE), without a "dot" to separate labels in the domain name, to offer service identifiers.

The expanding list of TLDs, the use of iTLDs, and/or the use of dotless domains can result in an increased likelihood of domain name collisions, where there is an overlap between namespaces. Domain name collisions can yield unintended or harmful results, such as incorrectly navigating a device to the wrong webpage or other resource, allowing unauthorized users access to secure resources, incorrect or inefficient routing of a DNS resolution request, etc.

Accordingly, in some embodiments, a user device and/or a DNS resolver (e.g., an internal or a global DNS resolver) can be configured to determine contextual information about a device and/or user of a device to augment the DNS resolution process. For example, a user device can determine a connection interface to use for transmitting a DNS request (e.g., a cellular data network interface or a WIFI interface), an internal DNS resolver can determine whether to resolve a request locally or to transmit the request to a global resolver, a global DNS resolver can determine how to route the request and/or which resource to return in response to the request, etc.

In some implementations, the contextual information can be included with the DNS resolution request (e.g., encoded in the domain name (e.g., in a query name), as metadata, etc.), and a user device can generate the DNS resolution request with the contextual information and/or a resolver can extract the contextual information from a received DNS resolution request. Many devices can determine and/or maintain various contextual information about the device and/or a user of the device, such as the devices location (e.g., using a Global Positioning System (GPS) receiver, a geolocated access point, etc.), user credentials (e.g., a username, password, etc.), device credentials (e.g., a service set identifier (SSID), a certificate, a cryptographic key, a media access control (MAC) address, an IP address, etc.), and the like.

Using the contextual information to augment the DNS resolution process can result in, for example: reduced usage of processing resources, networking resources, and time (e.g., by more efficient resolution request routing and/or by reduced navigation after the initial request); improved resolution results; more secure resolution results, and the like. Further, using the contextual information to augment the DNS resolution process can reduce or, in some instances, eliminate domain name collisions, in particular with regard to dotless domain names.

FIG. 1 is a diagram illustrating an example network environment 100 that uses DNS, consistent with certain disclosed embodiments. In some embodiments, the environment 100 can include a network 110, a DNS resolver 120, an internal network 130, an internal network 140, and a computer 150. In some implementations, the internal network 130 can include a computer 132, an internal DNS resolver 134, and a local resource storage 136. In further implementations, the internal network 140 can include a computer 142, an internal DNS resolver 144, and a local resource storage 146.

In some embodiments, the network 110 can represent any type of one or more wired and/or wireless telecommunications networks. For example, the network 110 can represent the Internet and/or one or more telephone networks, one or more cellular data networks, one or more local area networks (LANs), etc. In some implementations, computing devices, such as, for example, the computer 132, the computer 142, and the computer 150, can connect to, for example, the DNS resolver 120 via the network 110.

In further embodiments, the environment 100 can include a geofence 138, associated with the internal network 130, and a geofence 148, associated with the internal network 140. As used herein, a geofence can represent a virtual perimeter for a real-world geographic area. For example, a geofence can be a radius around a specific point in a real-word geographic area, can be a predefined set of boundaries (e.g., around a certain real-world property or building), and the like.

In some embodiments, the DNS resolver 120 can represent one or more computing devices. For example, the DNS resolver 120 can represent one or more DNS name servers, recursive DNS name servers, domain name registry servers, database servers, web servers, mainframe computers, routers, etc. In some implementations, the DNS resolver 120 can be a global DNS resolver for one or more global TLDs.

As used herein, a DNS resolver (internal, global, etc.) can represent any device that can receive a DNS resolution request and either forward the request to another DNS resolver or resolve the request itself by obtaining a resource (e.g., a DNS record, an IP address, a file, etc.) stored locally or on another device (e.g., a database) in response to the request. Accordingly, a DNS resolver, as used herein, can route received DNS resolution requests and not perform any actual resolutions, can route some received DNS resolution requests and can resolve other DNS resolution requests, or may not route received DNS resolution requests to other resolvers but can resolve received DNS resolution requests.

In some embodiments, the DNS resolver 120 can extract contextual information from DNS resolution requests, and can use the contextual information to determine, for example, how to route the request and/or how to resolve the request.

In some implementations, the internal network 130 can be the internal network of an organization (e.g., a business, an agency, an individual, etc.) or a location. For example, the internal network 130 can be one or more LANs that include one or more wired and/or wireless connections.

In some embodiments, the internal DNS resolver 134 can represent one or more computing devices connected to the internal network 130. For example, the internal DNS resolver 134 can represent one or more internal name servers, database servers, web servers, mainframe computers, routers, etc. In some implementations, the internal DNS resolver 134 can be an internal DNS resolver for the network 130.

In further embodiments, the internal DNS resolver 134 can extract contextual information from DNS resolution requests, and can use the contextual information to determine, for example, how to route the request (e.g., resolve locally or route to a global resolver) and/or how to resolve the request.

In some implementations, the internal DNS resolver 134 can resolve DNS resolution requests locally by obtaining resources from the local resource storage 136 in response to the requests. A resource can be, for example, a file (e.g. a webpage, a document, etc.), a network address of a file or a local service, a DNS record, and the like.

The local resource storage 136 can represent one or more computing devices connected to the internal network 130. For example, the local resource storage 136 can represent one or more user devices (e.g., desktop computers, laptops, mobile devices (e.g., tablet devices, smartphones, and the like), database servers, mainframe computers, etc.) In some implementations, the local resource storage 136 can be part of the internal DNS resolver 134.

In some embodiments, the computer 132 can represent one or more end-user computing devices connected to the internal network 130, such as, for example, desktop computers, laptops, mobile devices, etc. The computer 132 can be connected to the internal network 130 and can be physically located within the geofence 138. In various embodiments, contextual information (e.g., GPS coordinates, signal strength from a wireless access point, etc.) about the computer 132 and/or a user of computer 132 can be included with DNS resolution requests from the computer 132, and the contextual information can be used by a DNS resolver (e.g., the internal DNS resolver 134) to determine how to route and/or resolve the DNS resolution requests. For example, the internal DNS resolver 134 may resolve DNS resolution requests locally based on determining that the computer 132 is within geofence 138 using the contextual information.

In some embodiments, the computer 132 may be able to connect to different networks using different connection interfaces. For example, the computer 132 may be to connect to the internal network 130 using a WIFI interface and may be able to connect to the network 110 using a cellular data network interface. In further embodiments, the computer 132 can determine which connection interface to use based on contextual information. For example, the computer 132 can transmit a DNS resolution request to the internal DNS resolver 134 via a WIFI interface based on determining that the computer 132 is within the geofence 138. As a further example, if the computer 132 is moved outside of the geofence 138, the computer 132 can transmit a DNS resolution request to the DNS resolver 120 via a cellular data network interface based on determining that the computer 132 is outside of the geofence 138, even if a WIFI connection to the internal network 130 is available.

In some implementations, the internal network 140 can be the internal network of an organization (e.g., a business, an agency, an individual, etc.) or a location. For example, the internal network 140 can be one or more LANs that include one or more wired and/or wireless connections.

In some embodiments, the internal DNS resolver 144 can represent one or more computing devices connected to the internal network 140. For example, the internal DNS resolver 144 can represent one or more internal name servers, database servers, web servers, mainframe computers, routers, etc. In some implementations, the internal DNS resolver 144 can be an internal DNS resolver for the network 140.

In further embodiments, the internal DNS resolver 144 can extract contextual information from DNS resolution requests, and can use the information to determine, for example, how to route the request and/or how to resolve the request.

In some implementations, the internal DNS resolver 144 can resolve DNS resolution requests locally by obtaining resources from the local resource storage 146 in response to the requests.

The local resource storage 146 can represent one or more computing devices connected to the internal network 140. For example, the local resource storage 146 can represent one or more user devices, database servers, mainframe computers, etc.

In some embodiments, the computer 142 can represent one or more end-user computing devices connected to the internal network 140, such as, for example, desktop computers, laptops, mobile devices, etc. The computer 142 can be connected to the internal network 140, but may not be physically located within the geofence 140. In various embodiments, contextual information (e.g., GPS coordinates, signal strength from a wireless access point, etc.) about the computer 142 and/or a user of computer 142 can be included with DNS resolution requests from the computer 142, and the contextual information can be used by a DNS resolver (e.g., the internal DNS resolver 144) to determine how to route and/or resolve the DNS resolution requests. For example, the internal DNS resolver 144 may forward received DNS resolution requests to a global resolver based on determining that the computer 142 is not within geofence 148 (using the contextual information) even though the computer 142 is connected to the internal network 148.

In some implementations, the computer 150 can represent one or more end-user computing devices, such as, for example, desktop computers, laptops, mobile devices, etc. The computer 150 can be connected to the network 110. In various embodiments, contextual information about the computer 150 and/or a user of computer 150 can be included with DNS resolution requests from the computer 150, and the contextual information can be used by a DNS resolver (e.g., the DNS resolver 120) to determine how to route and/or resolve the DNS resolution requests. For example, the DNS resolver 120 may forward received DNS resolution requests to another resolver based on determining that the computer 150 is within a certain geofence (using the contextual information), may resolve the DNS resolution request by providing a secure webpage based on determining that the computer 150 and/or a user of the computer 150 is authorized to access the secure webpage, etc.

The schematic depicted in FIG. 1 is merely for the purpose of illustration and is not intended to be limiting. Further, the DNS depicted is merely a simplified example of a DNS, consistent with certain disclosed embodiments, but such an example is not intended to be limiting. For example, in various embodiments, the DNS can include additional networks, servers, computers, storage devices, DNS resolvers, and/or other devices. Additionally, the described devices can be separate devices, as pictured, or various devices can be combined, consistent with certain disclosed embodiments.

Figure 2:
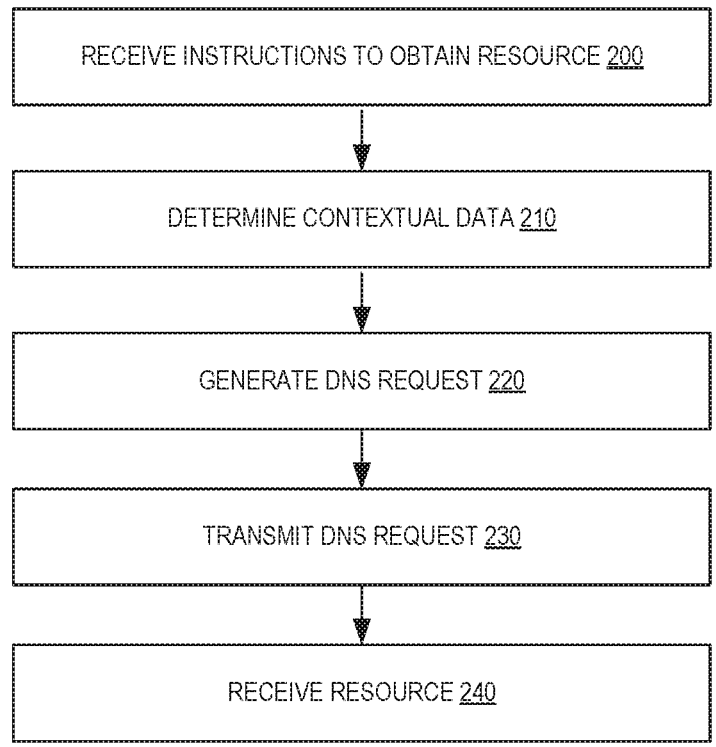
FIG. 2 is a flow diagram illustrating an example process for generating a DNS resolution request, consistent with certain disclosed embodiments.

FIG. 2 is a flow diagram illustrating an example process for generating a DNS resolution request, consistent with certain disclosed embodiments. In some embodiments, the method described in FIG. 2 can be performed using a computing device such as, for example, an end-user computing device, a server, a database, etc. For example, the method described in FIG. 2 can be performed by any one of computers 132, 142, and 150 in FIG. 1.

The process can begin in 200, when the computing device receives instructions to obtain a resource. In some embodiments, the computing device can additionally receive a domain name associated with the resource. In further embodiments, the resource can be, for example, a webpage or other type of file, while, in other embodiments, the resource can be an address (e.g., an IP address) of a webpage, a DNS record, or other type of file. For example, the instructions can be generated by a web browser when a user enters a domain name into an address bar of a web browser, a program on the computing device that attempts to access the resource using the domain name, etc.

In 210, the computing device can determine contextual data. In some embodiments, the contextual data can include contextual data corresponding to the computing device. For example, the contextual data can include a GPS location, a connection signal strength, a near-field communication (NFC) connection, accelerometer data, ambient light data, a timestamp, a device request history, a list of programs installed on the computing device, an operating system installed on the computing device, installed hardware identifiers, an international mobile subscriber identify (IMSI) and related key, an IP address, a MAC address, an SSID, a locally stored certificate, a locally stored cryptographic key, a radio-frequency identification (RFID), camera detection data, a screen size, a central processing unit (CPU) speed, a total storage size, a total storage available, a total memory available, a network protocol choice, a network topology of a connected network, an IP packet Time To Live (TTL), a resource whitelist, a resource blacklist, etc. In additional embodiments, the contextual data can include contextual data corresponding to a user of the computing device. For example, the contextual data can include a username, a password, demographic data, a user request history, a certificate associated with the user, a cryptographic key associated with the user, etc.

In some implementations, contextual data can be determined using one or more sensors of the computing device. For example, GPS location can be determined using a GPS receiver, a connection signal strength can be determined using a WIFI interface or a cellular data network interface, ambient light data and camera detection data can be determined using a camera, etc. In further implementations, contextual data can be determined based on stored information on the computing device (e.g., a list of installed programs, a request history, hardware identifiers, etc.). In other implementations, the contextual data can be input by a user (e.g., a username, a password, etc.).

In 220, the computing device can generate a DNS resolution request. The DNS resolution request can be a request that includes a domain name associated with the resource that the computing device was instructed to obtain in 200. In some implementations, the domain name can include a second-level domain (SLD), e.g., EXAMPLE in EXAMPLE.COM, and a TLD, e.g., COM in EXAMPLE.COM. In other implementations, the domain name can be a dotless domain name (e.g., EXAMPLE).

In some embodiments, the DNS resolution request can include the contextual data that was determined in 210. In some implementations, the contextual data can be included with the DNS resolution request as part of a Uniform Resource Locator (URL) included in the DNS resolution request. For example, the contextual data can be encoded using a URL encoding function, such as, the encodeURI( ) function in the JavaScript scripting language, the rawurlencode( ) function in the PHP scripting language, or the Server.URLEncode( ) function in Active Server Pages (ASP) scripting language.

In other embodiments, the contextual data can be included with the DNS resolution request encoded in the domain name in the DNS resolution request. For example, the contextual data can be encoded in a query name (qname).

In further implementations, the contextual data can be included with the DNS resolution request as metadata included in a DNS resolution request packet generated by the computing device.

In 230, the computing device can transmit the DNS resolution request to a resolver using, for example, a wired network interface, a WIFI interface, a cellular data network interface, etc. The resolver can be, for example, an internal DNS resolver (e.g., the internal DNS resolvers 134 or 144 shown in FIG. 1) or a global DNS resolver (e.g., the DNS resolver 120 shown in FIG. 1).

In 240, the computing device can receive a resource in response to the DNS resolution request transmitted in 230. For example, the resource can be an IP address or other network address of a webpage, a DNS record, or other type of file. In various embodiments, once the IP address or other network address is received, the computing device can use the address to obtain a webpage or other type of file from a network location (e.g., a local network location or a global network location). As a further example, the resource received in 240 can be the webpage or other type of file.

While the steps depicted in FIG. 2 have been described as performed in a particular order, the order described is merely an example, and various different sequences of steps can be performed, consistent with certain disclosed embodiments. For example, the computing device can generate the DNS resolution request, determine the contextual data, and then add the contextual data to the DNS resolution request.

Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 3:
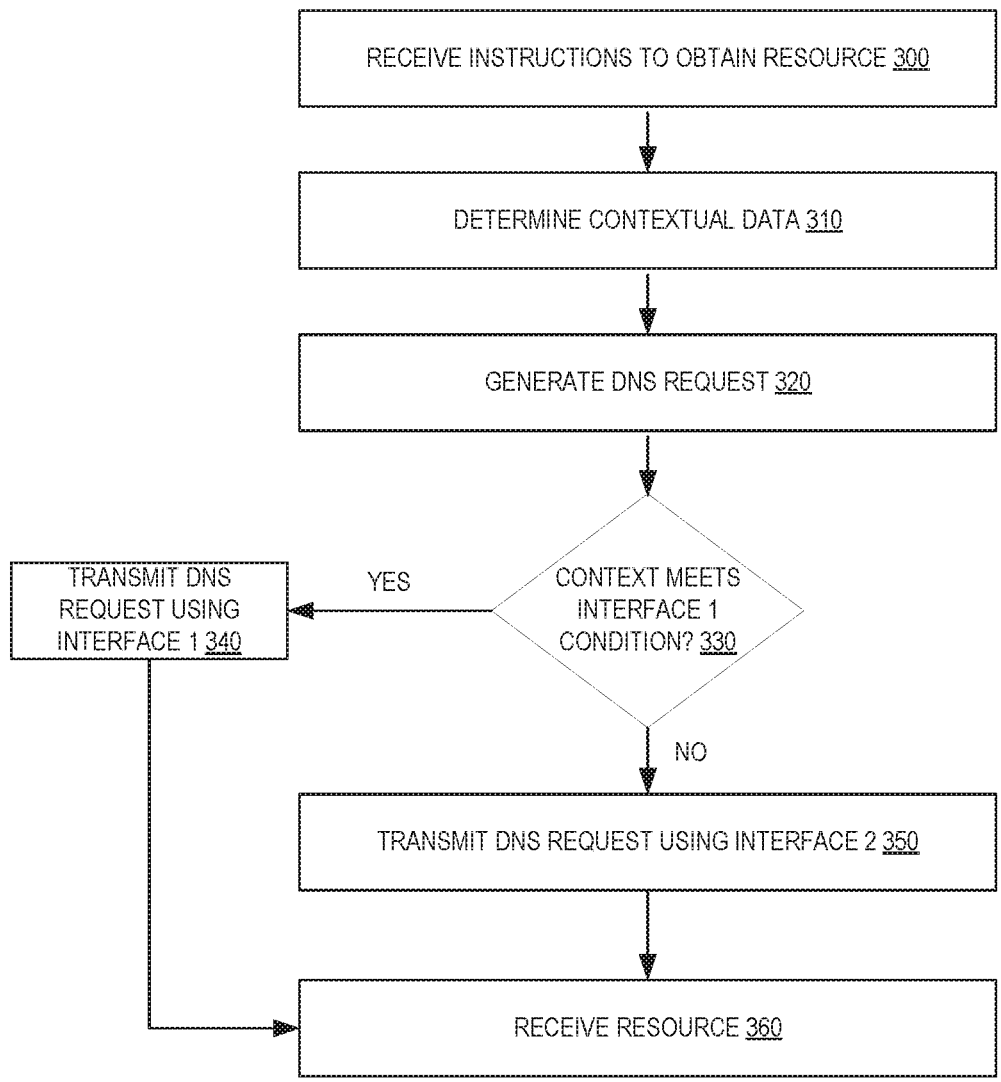
FIG. 3 is a flow diagram illustrating an example process for generating a DNS resolution request, consistent with certain disclosed embodiments

FIG. 3 is a flow diagram illustrating an example process for generating a DNS resolution request, consistent with certain disclosed embodiments. In some embodiments, the method described in FIG. 3 can be performed using a computing device such as, for example, an end-user computing device, a server, a database, etc. For example, the method described in FIG. 2 can be performed by any one of computers 132, 142, and 150 in FIG. 1.

The process can begin in 300, when the computing device receives instructions to obtain a resource. In some embodiments, the computing device can additionally receive a domain name associated with the resource. In further embodiments, the resource can be, for example, a webpage or other type of file, while, in other embodiments, the resource can be an address of a webpage, a DNS record, or other type of file.

In 310, the computing device can determine contextual data. In some embodiments, the contextual data can include contextual data corresponding to the computing device. In additional embodiments, the contextual data can include contextual data corresponding to a user of the computing device.

In some implementations, the contextual data can be determined using one or more sensors of the computing device. In further implementations, contextual data can be determined based on stored information on the computing device. In other implementations, the contextual data can be input by a user.

In 320, the computing device can generate a DNS resolution request. The DNS resolution request can be a resolution request that includes a domain name associated with the resource that the computing device was instructed to obtain in 300.

In some embodiments, the DNS resolution request can include contextual data that was determined in 310. In some implementations, the contextual data can be included with the DNS resolution request encoded in the domain name in the DNS resolution request. In further implementations, the contextual data can be included with the DNS resolution request as metadata included in a DNS resolution request packet generated by the computing device.

In some embodiments, the computing device may have multiple interfaces for transmitting DNS requests. For example, the computing device may have a wired network interface, a WIFI interface, and/or a cellular data network interface.

In some instances, the computing device may have a default interface of the multiple interfaces for performing network interactions (e.g., transmitting DNS requests) and/or a hierarchy for using the multiple interfaces. For example, the computing device may have a default interface of using a WIFI interface, but when a WIFI interface is unavailable the computing device may use a cellular data network interface.

In some implementations, the computing device can have contextual conditions corresponding to one or more of the multiple interfaces, and the computing device can compare current contextual data (e.g., as determined in 310) to contextual conditions for an interface. If the contextual conditions for an interface are met based on the current contextual data, that interface may be used for transmitting a DNS request. If the contextual conditions are not met, the computing device may determine which interface to use based on a normal procedure (e.g., a default interface, based on hierarchy, etc.).

In 330, the computing device can determine whether contextual conditions for a first interface are met based on the contextual data determined in 310. For example, the contextual conditions can include that a location of the computing device is within a particular geofence (e.g., geofence 138 or geofence 148 in FIG. 1). A resolution rule corresponding to the contextual condition may be to use the first interface (e.g., a WIFI connection) when the computing device is located within the particular geofence.

Other contextual conditions can include, but are not limited to: that the computing device is outside of a particular geofence; that a connection signal strength to a particular access point is greater than a threshold; or that an authorized username and password have been entered by a user.

If, in 330, the contextual rule is met (330: YES), the process can proceed to 340, and the computing device can transmit the DNS resolution request to a resolver via the first interface.

If, in 330, the contextual rule is not met (330: NO), the process can proceed to 350, and the computing device can transmit the DNS resolution request to a resolver via a second interface, which can be, for example, a default interface.

In 360, the computing device can receive a resource in response to the DNS resolution request transmitted in 340 or 360. In some embodiments, the resource can be received via the same interface that transmitted the request while, in other embodiments, the resource can be received via a different interface.

While the steps depicted in FIG. 3 have been described as performed in a particular order, the order described is merely an example, and various different sequences of steps can be performed, consistent with certain disclosed embodiments. For example, the computing device can generate the DNS resolution request, determine the contextual data, and then add the contextual data to the DNS resolution request. Moreover, the computing device may have contextual conditions for multiple interfaces, and can determine which contextual conditions are met based on the contextual data or transmit the request using a default interface if none of the contextual conditions are met. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 4:
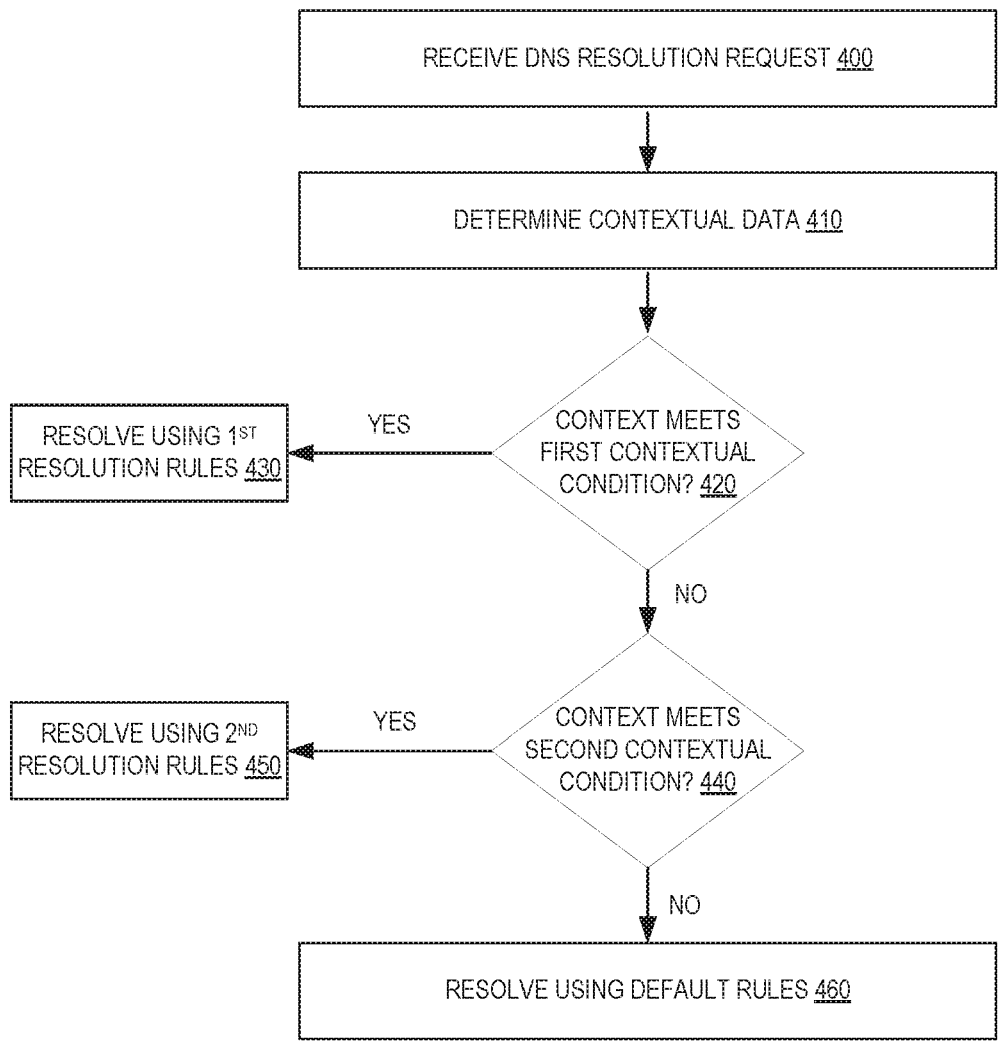
FIG. 4 is a flow diagram illustrating an example process for resolving a DNS resolution request, consistent with certain disclosed embodiments.

FIG. 4 is a flow diagram illustrating an example process for resolving a DNS resolution request, consistent with certain disclosed embodiments. In some embodiments, the method described in FIG. 4 can be performed using a computing device such as, for example, a DNS name server, an internal name server, a recursive DNS name server, a domain name registry server, a database server, a web server, a mainframe computer, a router, etc. For example, the method described in FIG. 4 can be performed by any one of resolvers 120, 134, and 144 in FIG. 1.

The process can begin in 400, when the computing device receives a DNS resolution request. The DNS resolution request can be received from an end-user device or a server that generated the request or the request can be received from another resolver that forwarded the request.

In some embodiments, the DNS resolution request can include contextual data, as described above. For example, the contextual data can be encoded in a domain name or can be included as metadata.

In 410, the computing device can determine the contextual data associated with the DNS resolution request. In some embodiments, the computing device can extract the contextual data from the URL in the request or from the DNS request packet that included the request.

In 420, the computing device can determine whether a contextual condition for a first resolution rule is met based on the contextual data determined in 410. For example, the contextual data can include an indication of a location of the computing device, and the location can be within a particular geofence (e.g., geofence 138 or geofence 148 in FIG. 1). Additionally, the contextual data may include a username and password. A contextual condition may be that the computing device is located within the particular geofence and the user is an authorized user. The corresponding resolution rule may be to resolve the request locally by obtaining the resource, that is only available to authorized users, from storage on the computing device or from storage available within an internal network that includes the computing device.

If, in 420, the contextual condition is met (420: YES), the process can proceed to 430, and the computing device can resolve the DNS resolution request based on applying the resolution rule. If, in 420, the contextual condition is not met (420: NO), the process can proceed to 440.

In 440, the computing device can determine whether a contextual condition for a second resolution rule is met based on the contextual data determined in 410. For example, the contextual data can include an indication of a location of the computing device, and the location can be within a particular geofence. Additionally, the contextual data may not include an authorized username and/or password. A contextual condition may be that the computing device is located within the particular geofence and the user is not an authorized user. The corresponding resolution rule may be to resolve the request locally by obtaining a non-sensitive resource (i.e., that can be provided to unauthorized users) from storage on the computing device or from storage available within an internal network that includes the computing device. For example, the non-sensitive resource can indicate a failure to access a requested resource, can be a DNS record and/or an address of a webpage with non-sensitive information, etc.

If, in 440, the contextual condition is met (440: YES), the process can proceed to 450, and the computing device can resolve the DNS resolution request based on applying the second resolution rule. If, in 440, the contextual condition is not met (440: NO), the process can proceed to 460.

Other example contextual conditions and/or resolution rules can include but are not limited to, obtaining a geo-specific resource based on a location in the contextual data, obtaining a time-specific resource based on a timestamp in the contextual data, obtaining a device-specific resource based on hardware information in the contextual data, obtaining a user-specific resource based on a username or user-browsing history in the contextual data, adding contextually-relevant advertisements to the resource, forwarding the DNS resolution request to a global resolver, forwarding the DNS resolution request to a local or internal resolver, obtaining a resource based on the resource being on a resource whitelist or not on a resource blacklist, obtaining a resource indicating a webpage could not be obtained based on a requested resource not being on a resource whitelist or being on a resource blacklist, etc.

In 460, the computing device can resolve the DNS resolution request based on applying a default resolution rule. In some embodiments, a default resolution rule can be to forward the DNS resolution request to another resolver. For example, the computing device can be an internal resolver for an internal network, and the computing device can forward the DNS resolution request to a global resolver for global resolution based on contextual conditions and corresponding resolution rules. As a further example, the computing device can be a global resolver, but can forward the DNS resolution request to another global resolver based on contextual conditions and corresponding resolution rules.

While the steps depicted in FIG. 4 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 5:
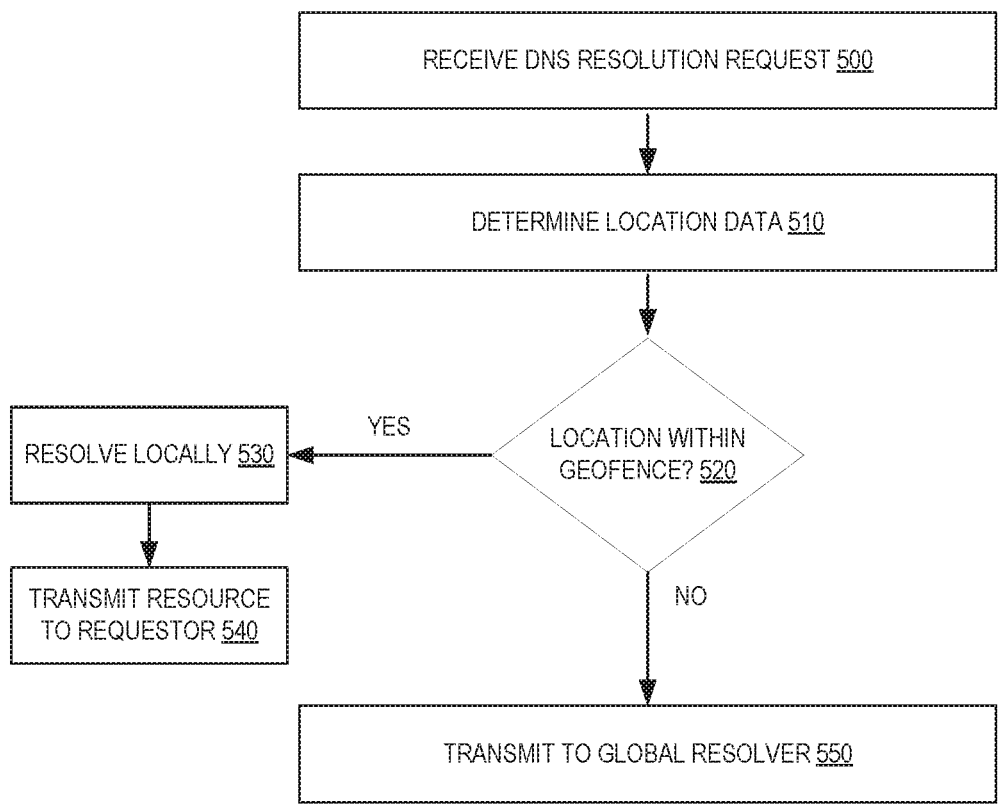
FIG. 5 is a flow diagram illustrating an example process for resolving a DNS resolution request, consistent with certain disclosed embodiments.

FIG. 5 is a flow diagram illustrating an example process for resolving a DNS resolution request, consistent with certain disclosed embodiments. In some embodiments, the method described in FIG. 5 can be performed using a computing device such as, for example, an internal name server, a router, etc. For example, the method described in FIG. 5 can be performed by any one of resolvers 134 and 144 in FIG. 1.

The process can begin in 500, when the computing device receives a DNS resolution request. The DNS resolution request can be received from an end-user device or a server that generated the request or the request can be received from resolver or other device that forwarded the request.

In some embodiments, the DNS resolution request can include contextual data, as described above. For example, the contextual data can be encoded in a domain name or can be included as metadata.

In 510, the computing device can determine the contextual data associated with the DNS resolution request. In some embodiments, the computing device can extract the contextual data from the URL in the request or from the DNS request packet that included the request.

In 520, the computing device can determine whether a location in the contextual data is within a geofence. For example, the geofence can be associated with the boundaries of a building belonging to an organization. Thus, employees and/or members of the organization can have DNS requests locally resolved when within the building and can have DNS requests resolved globally when outside of the building.

If, in 520, the location is within the geofence (520: YES), the process can proceed to 530.

In 530, the computing device can resolve the request locally. For example, the computing device can obtain the resource from storage on the computing device or from storage available within an internal network that includes the computing device.

In 540, the computing device can transmit the resource back to the requestor.

If, in 520, the location is not within the geofence (520: NO), the process can proceed to 550, and the computing device can transmit the DNS resolution request to a global resolver for global resolution.

In various embodiments, the computing device may only perform 510-540 if a domain name associated with the DNS resolution request can be locally resolved. For example, if the computing device is in an internal network associated with a INTERNAL TLD, the computing device may perform 510-540 when a DNS resolution request is received that is associated with the .INTERNAL TLD (e.g., EXAMPLE.INTERNAL). If the TLD is not .INTERNAL (e.g., EXAMPLE.COM), the computing device may proceed from 500 to 550 and transmit the DNS resolution request to a global resolver.

While the steps depicted in FIG. 5 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 6:
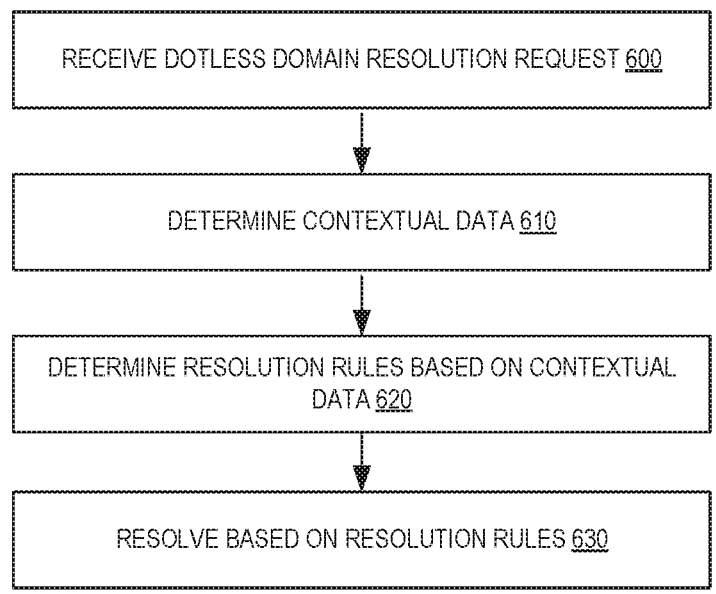
FIG. 6 is a flow diagram illustrating an example process for resolving a dotless domain resolution request, consistent with certain disclosed embodiments.

FIG. 6 is a flow diagram illustrating an example process for resolving a dotless domain resolution request, consistent with certain disclosed embodiments. In some embodiments, the method described in FIG. 6 can be performed using a computing device such as, for example, a DNS name server, an internal name server, a recursive DNS name server, a domain name registry server, a database server, a web server, a mainframe computer, a router, etc. For example, the method described in FIG. 6 can be performed by any one of resolvers 120, 134, and 144 in FIG. 1.

The process can begin in 600, when the computing device receives a dotless domain DNS resolution request. The dotless domain DNS resolution request can be received from an end-user device or a server that generated the request or the request can be received from another resolver that forwarded the request.

In some embodiments, the dotless domain DNS resolution request can include contextual data, as described above. For example, the contextual data can be encoded in a domain name or can be included as metadata.

In 610, the computing device can determine the contextual data associated with the dotless domain DNS resolution request. In some embodiments, the computing device can extract the contextual data from the URL in the request or from the DNS request packet that included the request.

In 620, the computing device can compare the contextual data to contextual conditions and determine a resolution rule to use based on the contextual data.

For example, the dotless domain associated with the request can be COFFEE, and the contextual data can include a location. Thus, the resolution rule can be to return a location-specific resource that results in displaying, on the requestors device, a list of local coffee shops near the location and/or a map to a local coffee shop. Or, the resolution rules can be to forward the dotless domain DNS resolution request to another resolver that resolves COFFEE requests for that particular location (e.g., a resolver maintained by a coffee store company).

As a further example, the dotless domain associated with the request can be SECURITY, and the contextual data can include a location. Thus, if the computing device is an internal DNS resolver for a building and the location is within the building the resolution rule can be to provide a local resource that can be used to contact the building's security, provide hotline information, generate alert statuses for authorized users, etc. If the computing device is not an internal DNS resolver for the building, then the request can be forwarded to an internal DNS resolver for the building. If the computing device is an internal DNS resolver for the building and the location is outside of the building, the resolution rule can be to forward the request to another resolver (e.g., a global resolver), and that resolver can either forward the request or provide a resource that can be used to contact the police or other security force.

In 630, the computing device can resolve the request based on the determined resolution rules. Thus, dotless domains can be resolved using contextual information, which can result in avoiding domain name collisions that could otherwise occur due to the reduced namespace and the potential lack of specificity in using dotless domains.

While the steps depicted in FIG. 6 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 7:
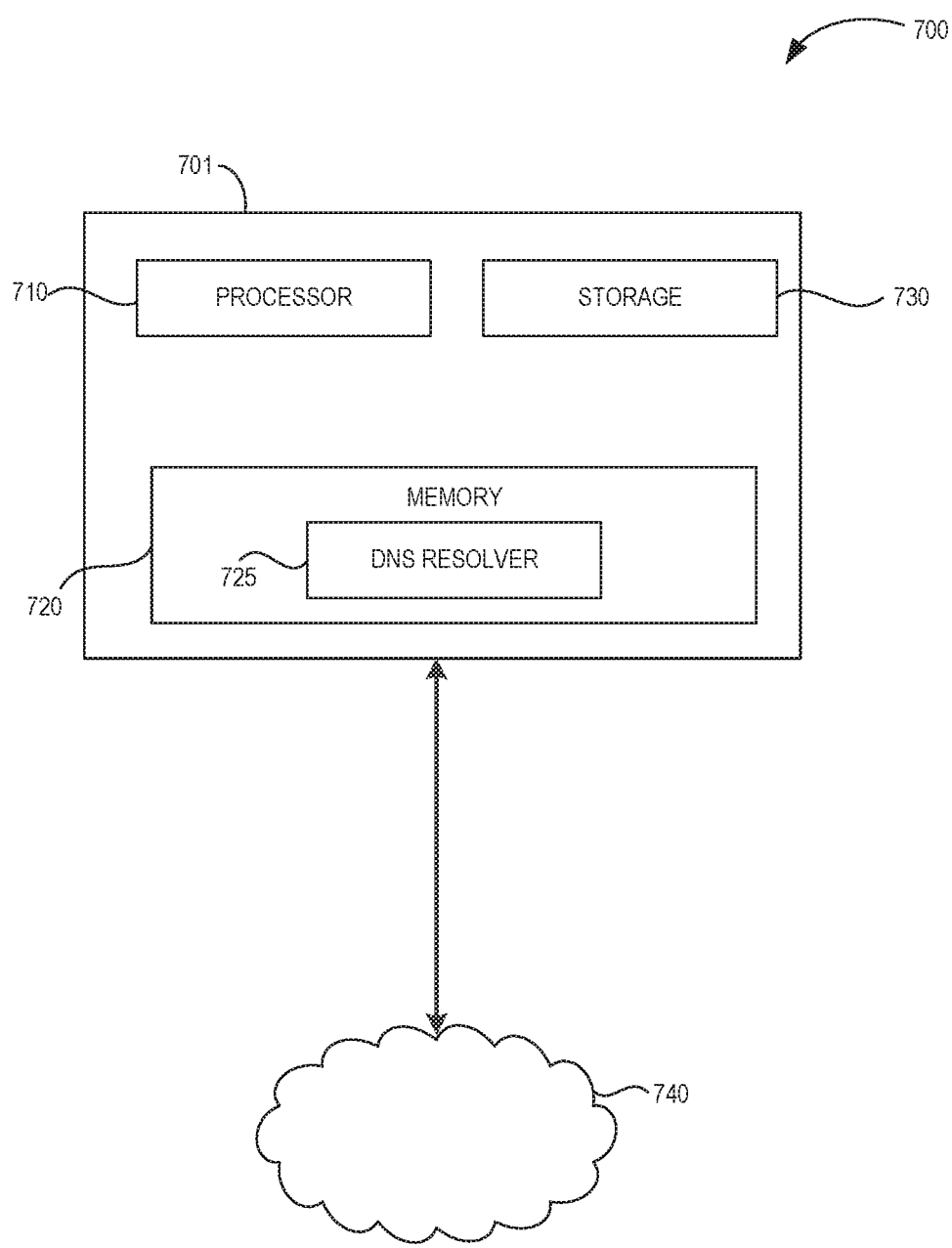
FIG. 7 is a diagram illustrating an example of a hardware system for DNS resolution, consistent with certain disclosed embodiments.

FIG. 7 is a diagram illustrating an example of a hardware system for DNS resolution, consistent with certain disclosed embodiments. An example hardware system 700 includes example system components that may be used. The components and arrangement, however, may be varied.

Computer 701 may include processor 710, memory 720, storage 730, and input/output (I/O) devices (not pictured). The computer 701 may be implemented in various ways and can be configured to perform any of the embodiments described above. In some embodiments, computer 701 can be a computer of an end-user such as, for example, a desktop computer, a laptop, a mobile device (e.g., a smartphone or a tablet device), etc. In other embodiments, computer 701 can be a computing device such as, for example, a database server (e.g., a domain name registry and/or name server), a web server, a mainframe computer, etc. For example, computer 701 can be DNS resolvers 120, 134, and 144, local resource storages 136 and 146, and/or computers 132, 142, and 150 in FIG. 1. Computer 701 may be standalone or may be part of a subsystem, which may, in turn, be part of a larger system.

The processor 710 may include one or more known processing devices, such as a microprocessor from the Intel Core™ family manufactured by Intel™, the Phenom™ family manufactured by AMD™, or the like. Memory 720 may include one or more storage devices configured to store information and/or instructions used by processor 710 to perform certain functions and operations related to the disclosed embodiments. Storage 730 may include a volatile or non-volatile, magnetic, semiconductor, tape, optical, removable, non-removable, or other type of computer-readable medium used as a storage device. In some embodiments, storage 730 can include, for example, domain name records or other resources, contextual information, contextual rules, and resolution rules, etc.

In an embodiment, memory 720 may include one or more programs or subprograms including instructions that may be loaded from storage 730 or elsewhere that, when executed by computer 701, perform various procedures, operations, or processes consistent with disclosed embodiments. For example, memory 720 may include DNS resolver program 725 for generating DNS requests, determining contextual data, routing DNS requests based on contextual data, resolving DNS requests based on contextual data, providing DNS responses, and/or receiving DNS responses, according to various disclosed embodiments. Memory 720 may also include other programs that perform other functions, operations, and processes, such as programs that provide communication support, Internet access, etc. The DNS resolver program 725 may be embodied as a single program, or alternatively, may include multiple sub-programs that, when executed, operate together to perform the function of the DNS resolver program 725 according to disclosed embodiments. In some embodiments, DNS resolver program 725 can perform all or part of the processes of FIGS. 2-6, described above.

Computer 701 may communicate over a link with network 740. For example, the link may be a direct communication link, a local area network (LAN), a wide area network (WAN), or other suitable connection. Network 740 may include the internet, as well as other networks, which may be connected to various systems and devices.

Computer 701 may include one or more input/output (I/O) devices (not pictured) that allow data to be received and/or transmitted by computer 701. I/O devices may also include one or more digital and/or analog communication I/O devices that allow computer 701 to communicate with other machines and devices. I/O devices may also include input devices such as a keyboard or a mouse, and may include output devices such as a display or a printer. Computer 701 may receive data from external machines and devices and output data to external machines and devices via I/O devices. The configuration and number of input and/or output devices incorporated in I/O devices may vary as appropriate for various embodiments.

Example uses of the system 700 can be described by way of example with reference to the embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system comprising:
   a processing system of a device comprising one or more processors; and
   a memory system comprising one or more computer-readable media, wherein the one or more computer-readable media contain instructions that, when executed by the processing system, cause the processing system to perform operations comprising:
   receiving a dotless domain resolution request from a requesting device;
   determining a contextual data from the dotless domain resolution request;
   determining a resolution rule from a plurality of resolution rules based on the contextual data; and
   resolving the dotless domain resolution request by applying the contextual data and the determined resolution rule.

2. The system of claim 1, wherein the dotless domain resolution request is received from an end-user device or a server that generates the dotless domain resolution request.

3. The system of claim 1, wherein the dotless domain resolution request is received from a first resolver that forwards the dotless domain resolution request.

4. The system of claim 1, wherein determining the contextual data comprises extracting the contextual data from a uniform resource locator (URL) in the dotless domain resolution request.

5. The system of claim 1, wherein determining the contextual data comprises extracting the contextual data from a domain name system (DNS) request packet comprising the dotless domain resolution request.

6. The system of claim 1, wherein the contextual data is encoded in a domain name or is included as metadata.

7. The system of claim 1, wherein the contextual data comprises a location.

8. The system of claim 7, wherein the determined resolution rule comprises returning a location-specific resource.

9. The system of claim 8, wherein resolving the dotless domain resolution request comprises displaying information related to the location-specific resource.

10. The system of claim 7, wherein the determined resolution rule comprises providing a local resource.

11. The system of claim 7, wherein the determined resolution rule comprises forwarding the dotless domain resolution request to a second resolver.

12. The system of claim 1, wherein the resolution rule is determined by comparing the contextual data with a contextual condition.

13. The system of claim 12, wherein the contextual data further comprises at least one of: a location, a connection signal strength, a near-field communication (NFC) connection, accelerometer data, ambient light data, a timestamp, a device request history, a list of programs installed on a computing device, an operating system installed on a computing device, installed hardware identifiers, an international mobile subscriber identify (IMSI) and related key, an Internet Protocol (IP) address, a media access control (MAC) address, a service set identifier (SSID), a certificate, a cryptographic key, a radio-frequency identification (RFID), camera detection data, a screen size, a central processing unit (CPU) speed, a total storage size, a total storage available, a total memory available, a network protocol choice, a network topology of a connected network, an IP packet Time To Live (TTL), a resource whitelist, a resource blacklist, a username, a password, demographic data, a user request history, a certificate associated with a user, or a cryptographic key associated with a user.

14. A method performed by a device comprising one or more processors, comprising:
   receiving a dotless domain resolution request from a requesting device;
   determining a contextual data from the dotless domain resolution request;
   determining a resolution rule from a plurality of resolution rules based on the contextual data; and
   resolving the dotless domain resolution request by applying the contextual data and the determined resolution rule.

15. The method of claim 14, wherein the dotless domain resolution request is received from an end-user device or a server that generates the dotless domain resolution request.

16. The method of claim 14, wherein the dotless domain resolution request is received from a first resolver that forwards the dotless domain resolution request.

17. The method of claim 14, wherein determining the contextual data comprises extracting the contextual data from a uniform resource locator (URL) in the dotless domain resolution request.

18. The method of claim 14, wherein determining the contextual data comprises extracting the contextual data from a domain name system (DNS) request packet comprising the dotless domain resolution request.

19. The method of claim 14, wherein the contextual data is encoded in a domain name or is included as metadata.

20. A non-transitory computer-readable storage medium comprising instructions for causing one or more processors to perform a method comprising:
   receiving a dotless domain resolution request from a requesting device;
   determining a contextual data from the dotless domain resolution request;
   determining a resolution rule from a plurality of resolution rules based on the contextual data; and
   resolving the dotless domain resolution request by applying the contextual data and the determined resolution rule.

* * * * *